US006474915B1

(12) United States Patent
Wildenberg

(10) Patent No.: US 6,474,915 B1
(45) Date of Patent: Nov. 5, 2002

(54) COMPENSATING SYSTEM FOR A HEXAPOD

(75) Inventor: François Wildenberg, Contrexéville (FR)

(73) Assignee: Constructions Mécaniques des Vosges, Rozières aur Mouzon (FR)

(*) Notice: Subject to any disclaimer, the term of this patent is extended or adjusted under 35 U.S.C. 154(b) by 0 days.

(21) Appl. No.: 09/674,060
(22) PCT Filed: Apr. 27, 1999
(86) PCT No.: PCT/FR99/00990
§ 371 (c)(1),
(2), (4) Date: Oct. 25, 2000
(87) PCT Pub. No.: WO99/55488
PCT Pub. Date: Nov. 4, 1999

(30) Foreign Application Priority Data

Apr. 27, 1998 (FR) .............................. 98/05682

(51) Int. Cl.⁷ ............................. B23C 9/00; B23C 1/12
(52) U.S. Cl. ...................... 409/201; 409/235; 409/237; 74/490.03
(58) Field of Search ................... 409/201, 211, 409/216, 235, 237, 238, 239; 408/236; 74/490.03; 901/22, 23, 41

(56) References Cited

U.S. PATENT DOCUMENTS 3,707,333 A * 12/1972 Kitamura et al. ........... 409/237
5,354,158 A   10/1994 Sheldon et al.
5,388,935 A *  2/1995 Sheldon ...................... 409/201
5,556,242 A *  9/1996 Sheldon et al. ............. 409/201
5,681,981 A   10/1997 McMurtry
5,787,758 A *  8/1998 Sheldon ...................... 409/201
6,021,579 A1 * 2/2001 Schimmels et al. ........... 33/645
6,223,604 B1 * 5/2001 Fronczak et al. ............. 73/856

FOREIGN PATENT DOCUMENTS

| EP | 0489857 | 7/1996 |
| EP | 0834383 | 4/1998 |
| FR | 2549916 | 2/1985 |
| GB | 2144711 A | * 3/1985 |
| WO | WO9520747 | 8/1995 |

OTHER PUBLICATIONS

"Impedance Controlled Surface" Research Document. No. 328, p. 586, Aug. 1, 1991 (XP000217890).

* cited by examiner

Primary Examiner—A. L. Wellington
Assistant Examiner—Erica E Cadugan
(74) Attorney, Agent, or Firm—Gary M. Cohen

(57) ABSTRACT

A hexapod, for example, a hexapod used to position a tool with respect to a part to be machined, includes two spaced plates interconnected by six articulated and extensible legs. The two plates, including a base plate and a mobile plate, and the six legs are joined for varying, at will, the relative position of the mobile plate with respect to that of the base plate. The hexapod further includes a device for reducing and/or compensating for stresses on the elements of the hexapod, which can be a mechanical device, such as a jack, coupling a fixed surface with the periphery of the mobile plate and/or logic (in software) for defining at least one force-limiting criterion.

12 Claims, 2 Drawing Sheets

COMPENSATING SYSTEM FOR A HEXAPOD

BACKGROUND OF THE INVENTION

The present invention concerns an improvement for a hexapod.

A hexapod can, for example, be used as a sub-assembly of a tooling machine used for positioning a tool with respect to a part to be machined. Hexapods can also be used in other applications, for example, to perform physical measurements.

A hexapod includes two plates, a working plate and a base plate, which are interconnected by six legs. The legs are articulated and extensible for varying, at will, the relative position of the working plate with respect to that of the base plate. Positioning and movement of the legs of the hexapod are controlled by a computer. An example of a hexapod of this type is described in EP 0 489 857.

SUMMARY OF THE INVENTION

It has been found to be desirable to provide a device that can reduce or compensate for stresses on the assembly of elements comprising the hexapod, particularly the legs and articulating parts of the hexapod.

For example, a hexapod for positioning a tool with respect to a part to be machined includes two plates, a mobile plate and a base plate, which are interconnected by six articulated and extensible legs for varying, at will, the relative position of the mobile plate with respect to that of the base plate. In accordance with the present invention, the hexapod is provided with a device for reducing or compensating for stresses on at least one of the elements of the hexapod.

To this end, a jack is provided which is received by a fixed surface and which operates to support the weight placed on the mobile plate of the hexapod. The jack can be placed vertically, including a rod which is fixed to the periphery of the mobile plate. As an alternative, the jack can be non-vertically positioned, and the compensating forces can be transmitted by a return pulley to an attachment point on the mobile plate. As a further alternative, the jack can control a movable arm which is then connected to the mobile plate.

Stresses on elements of the hexapod can also be reduced or compensated for by controlling the logic (in software) which is used to define at least one force-limiting criterion for operation of the hexapod. It is also possible to combine a mechanical compensation device with control of the logic (in software) for defining force-limiting criteria for operating the hexapod.

The present invention is further described below, with reference to the following figures.

DETAILED DESCRIPTION OF THE INVENTION

Figure 1C:
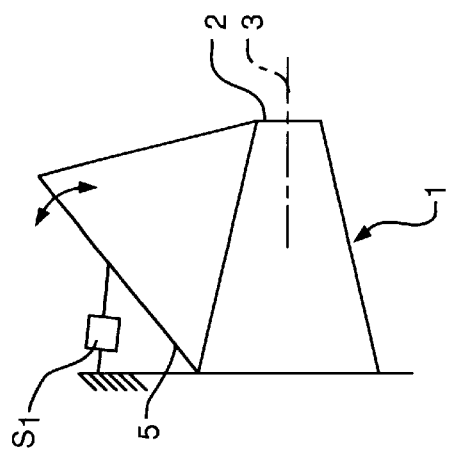
FIGS. 1B and 1C are schematic illustrations of further alternative embodiments of the device of the present invention.
Figure 1B:
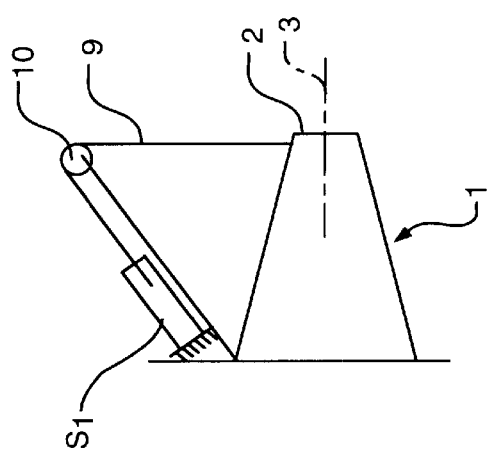
Figure 1A:
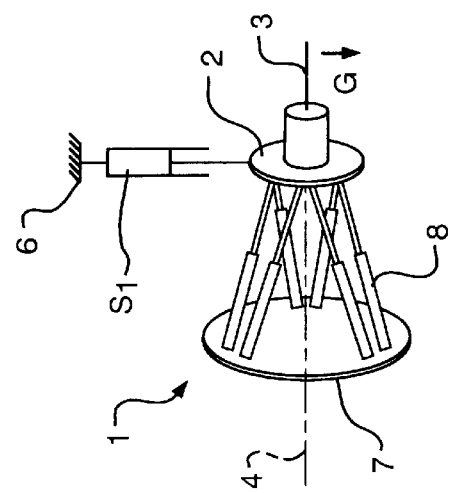
FIG. 1A is a schematic illustration of a first alternative embodiment of a stress compensating device produced in accordance with the present invention applied to a hexapod having a main axis which is approximately horizontal.

FIG. 1A schematically illustrates a hexapod (1) which can be used, for example, to position a tool with respect to a part to be machined. The hexapod (1) includes two plates, a mobile plate (2) and a base plate (7), which are interconnected by six articulated and extensible legs (8). The legs (8) can be articulated and extended, at will, to vary the relative position of the mobile plate (2) with respect to that of the base plate (7). In accordance with the present invention, the stresses on at least one of the components of the hexapod (1) are reduced or compensated for as follows.

One way to achieve this is to act on the logic for accessing a point on the trajectory of the tool.

Generally speaking, a hexapod has six degrees of freedom. However, only five of these are used. In effect, the arc of rotation of the electropin is most often not used. There is, therefore, an infinite leg length for reaching a point on the trajectory of the tool.

In this regard, leg lengths are selected by accessing logic, controlled by a computer, which defines criteria that can be taken in isolation or in series. This can include logic for defining criteria such as remaining within the limits of the travel of each leg, remaining within the limits of angulations, limiting forces, obtaining desired rigidity, obtaining desired precision, and keeping a constant orientation around the pin axis.

One way to reduce or compensate for stresses on at least one of the components of the hexapod (1) is to control, with the computer, at least one of the criteria for accessing a point on the trajectory. Such a solution is purely computer-oriented.

Another way to reduce or compensate for stresses on at least one of the components of the hexapod (1) is to use a mechanical compensation device. Examples of such mechanical compensation devices are described with reference to FIGS. 1A, 1B and 1C.

In FIGS. 1A, 1B and 1C, the hexapod (1) is placed horizontally, and is equipped with a mechanical compensation device implemented with a hydraulic or pneumatic jack ($S_1$). In each example, the jack ($S_1$) provides constant power, and supports the weight placed on the mobile plate (2). Although the hexapod (1) illustrated in these figures has been placed approximately horizontally, it is also possible for the hexapod to be placed in a vertical orientation.

In a first embodiment, shown in FIG. 1A, the jack ($S_1$) is placed vertically, coplanar with the mobile plate (2). The reference numbers 3 and 4 respectively denote the axis of the pin and the main horizontal axis of the hexapod (1).

The body of the jack ($S_1$) is supported by a fixed frame (6) and the rod of the jack ($S_1$) engages the mobile plate (2). The rod is fixed to the periphery of the terminal member, the mobile plate (2) of the hexapod (1), to avoid the risks of collision between the two structures.

The travel of the jack ($S_1$) is sufficient to accept all variations in the situation of the mobile plate (2), including both its position and orientation. It is important to have regular air flows available (by suitably adjusting the orifices of the jack, and the sizes of the distributor and the pressure regulator) so that variations in the volume of the chamber of the jack do not result in additional loads.

FIG. 1B shows a second embodiment for the jack ($S_1$). In this embodiment, unlike the embodiment shown in FIG. 1A, the jack ($S_1$) is not placed vertically. Instead, compensating forces are transmitted by a cable (9) which passes over a return pulley (10) and which is connected to an attachment point on the mobile plate (2).

FIG. 1C shows a third embodiment for the jack ($S_1$). In this embodiment, the rod extending from the jack ($S_1$) controls a movable arm (5) which is appropriately connected to the mobile plate (2).

The compensating forces of the jack ($S_1$) make it possible to re-center the working ranges of each leg of the hexapod (1) to load ranges that can be accepted by the electric activators, and are able to reduce the forces of extreme loads. This also has the advantages of simplifying the technology to be implemented, taking advantage of the tested reliability of pneumatic jacks, and allowing the compensating support to be used to assist in the assembly and disassembly of the head of the hexapod on the machining center.

Figure 2:
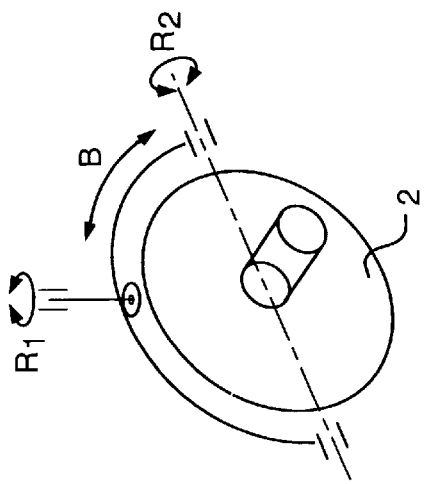
FIG. 2 is a schematic illustration showing possible movements of the mobile plate of a hexapod.

To simplify the hanging of the compensation device, it is possible to have the mobile plate (2) maintain two parallel axes, eliminating rotation about the axis of the pin, or to provide a compensation device which can support all inclinations of the mobile plate (2). Referring to FIG. 2, inclinations of the mobile plate (2) result from movements including rotation ($R_1$) around the pin, rotation ($R_2$) about a horizontal axis, and tilting (B) in a vertical plane.

Testing has been done to develop standards for the support, to determine the preferred application point for the compensating forces of the jack, and to determine the optimum compensating force of the jack. As a non-restrictive example, for a jack with a travel of 800 mm, an optimum compensating force of 3500 N at a point situated on the periphery of the mobile plate (2) and vertically offset by 6 mm (i.e., along the z axis of a Cartesian (x,y,z) system associated with the mobile plate) would be selected.

It is also possible to reduce or compensate for stresses on at least one of the components of the hexapod (1) by combining computer compensation of the accessing logic with a mechanical compensation device, for example, one of the previously described mechanical compensation devices.

Figure 3C:
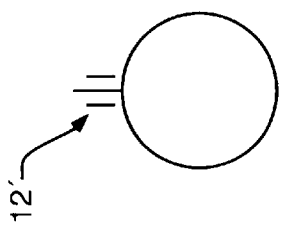
FIGS. 3A, 3B and 3C are schematic illustrations showing alternatives for joining the compensating device and the mobile plate.
Figure 3B:
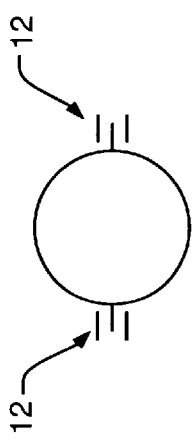
Figure 3A:
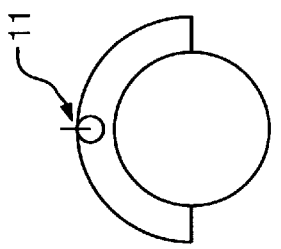

To facilitate movement of the plate (2) which is supported by the selected mechanical compensation device, it is possible to equip the hexapod with a link joined with the compensation device. For example, an articulated link can be provided at the point of rotation (11) around the pin, as is shown in FIG. 3A, or at the point (12, 12') where the mobile plate rotates about an axis, as is shown in FIGS. 3B and 3C, respectively. These three articulations can also be combined.

To improve control, the gain for the automatic action to be developed can be controlled according to the leg length and/or speed. The pressures in the mechanical compensation device can also be controlled according to these factors.

What is claimed is:

1. A hexapod used to position a tool with respect to a part to be machined, comprising:

two spaced plates, including a base plate and a mobile plate, interconnected by six articulated and extensible legs, wherein the spaced plates and the legs are joined for varying the position of the mobile plate relative to the position of the base plate; and a jack connected between a fixed frame and the mobile plate, wherein the fixed frame is separate from the hexapod, wherein the jack supports weight placed on the mobile plate, for reducing or compensating for stresses on at least one element of the hexapod;

wherein the tool is placed on an axis normal to the mobile plate and the base plate which is substantially horizontally oriented; and wherein the jack is connected to the mobile plate by a connecting structure which is substantially vertically oriented, to suspend the mobile plate and the weight placed on the mobile plate from the fixed frame.

2. The hexapod of claim 1 wherein the fixed frame is a fixed surface adjacent to the hexapod.

3. The hexapod of claim 1 wherein the jack is substantially vertically oriented, and wherein the jack is connected to peripheral portions of the mobile plate by a connecting rod.

4. The hexapod of claim 3 wherein the connecting rod is substantially vertically oriented.

5. The hexapod of claim 1 wherein the jack is non-vertically oriented, and wherein the jack is connected to peripheral portions of the mobile plate by a cable extending over a return pulley, for engaging the mobile plate.

6. The hexapod of claim 5 wherein portions of the cable extending between the jack and the return pulley are non-vertically oriented, and wherein portions of the cable extending between the return pulley and the peripheral portions of the mobile plate are substantially vertically oriented.

7. The hexapod of claim 1 wherein the jack is connected between the fixed frame and a movable arm which is connected to the mobile plate.

8. The hexapod of claim 7 wherein the jack is non-vertically oriented, and wherein the movable arm is connected to peripheral portions of the mobile plate by the connecting structure which is substantially vertically oriented.

9. The hexapod of claim 1 wherein the jack exerts a compensating force at a location which is offset from a center axis of the hexapod which receives the tool and which is normal to the mobile plate and the base plate.

10. The hexapod of claim 9 wherein the center axis of the hexapod is substantially horizontally oriented, and wherein the jack exerts the compensating force at a location which is vertically offset from the center axis of the hexapod.

11. The hexapod of claim 1 wherein movement of the mobile plate relative to the base plate is controlled by logic associated with a controller, and wherein the logic defines at least one force-limiting criterion.

12. The hexapod of claim 1 which further includes at least one articulated link connecting the jack with the mobile plate.

* * * * *